May 5, 1970   N. K. MORRIS   3,509,926
SLICER
Filed April 19, 1968
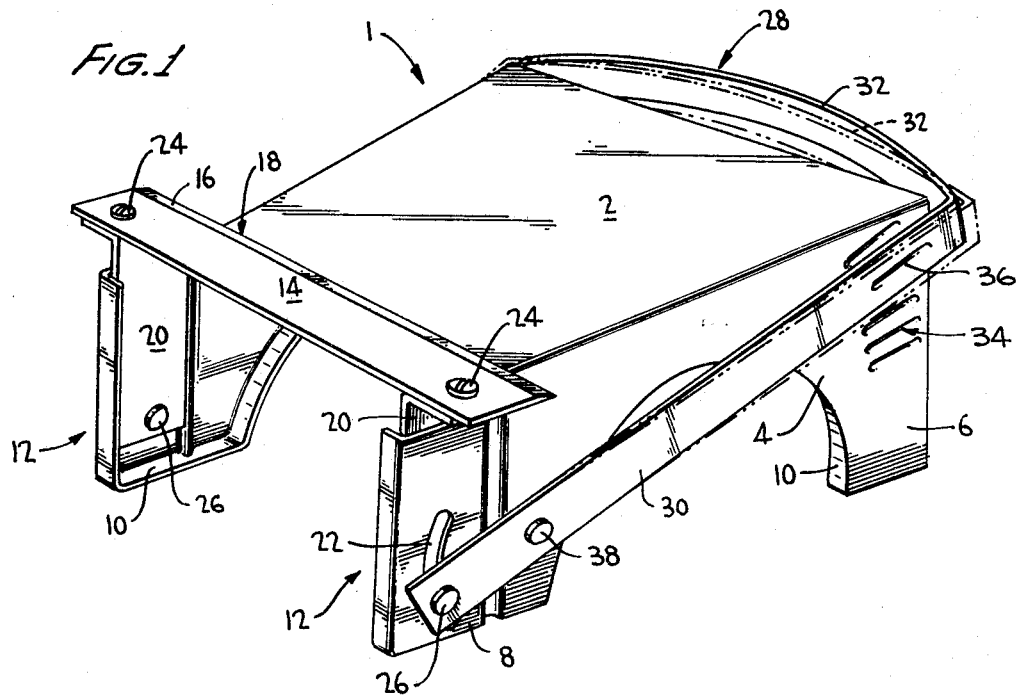
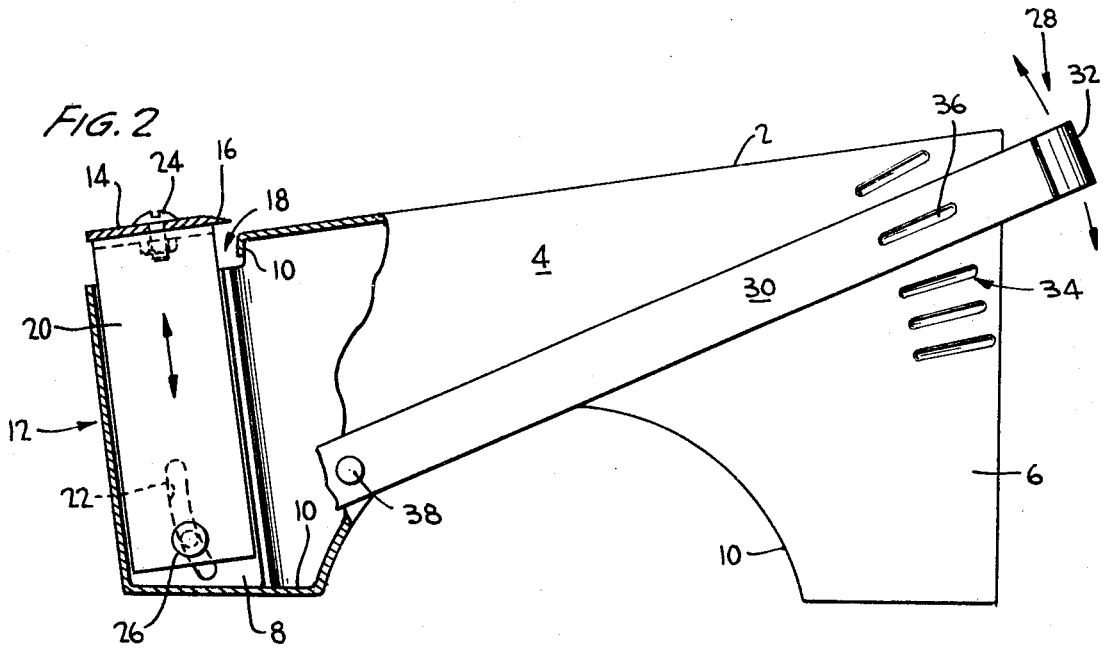
INVENTOR,
NATHAN K. MORRIS
BY Jacobi and Davidson
ATTORNEYS

United States Patent Office 3,509,926
Patented May 5, 1970

3,509,926
SLICER
Nathan K. Morris, Neptune, N.J.
(P.O. Box 543, Asbury Park, N.J. 07712)
Filed Apr. 19, 1968, Ser. No. 722,767
Int. Cl. B26d 4/00
U.S. Cl. 146—171                    4 Claims

ABSTRACT OF THE DISCLOSURE

An improved slicer comprising a body which provides a platform and side supports, the side supports extending forwardly beyond the front edge of the platform and defining internal, vertically extending tracks. Support means for a blade are slidably secured in the vertically extending tracks such that the blade is adjustable in a vertical direction above the surface of the platform. Novel lever means are provided comprising a substantially U-shaped member, the leg portions of which are pivotally mounted in superposed relation to the side supports with the end of the leg portions being coupled with the blade support means. The base portion of the substantially U-shaped member comprising the lever means extends between the side supports and is in spaced relation to the rear edge of the platform. When adjustment of the blade height is desired, the base portion of the lever member is pressed thus elastically deforming the leg portions of the lever member allowing the lever member to pivot and thus move the blade to a new position.

---

This invention generally relates to slicers and specifically concerns an improved, portable slicer for vegetables or the like.

Portable slicers have long been known in the art and many, relatively inexpensive embodiments of the same are presently manufactured. Such portable slicers have enjoyed wide-spread acceptance from the consuming public and normally comprise a raised platform area or surface adjacent to which is placed an adjustable knife blade. The user of these typical portable slicers, whether such use takes place in the kitchen of the home, a lunch-room or the like, would adjust the blade height to a selected position and then slide the vegetables to be sliced along the raised platform into the knife blade whereby a slice of any selected thickness can be removed from the vegetable. As should be appreciated, such portable slicers save the houswife much time and work and, of course, are far safer in operation than would be an ordinary kitchen knife, for example.

Difficulties have been encountered in the prior art construction, however, such difficulties primarily pertaining to the adjustment of the cutting blade or knife. Specifically, accurate adjustment to ensure the desired thickness of the vegetable slices could not be obtained without resorting to relatively complex and thus expensive apparatus. Further, once the blade height in the prior art constructions was adjusted or selected, oftentimes during operation of the vegetable slicer, the blade would move and thus become unadjusted. Difficulties were even encountered with those prior art constructions that did offer a suitable mechanism for maintaining the knife blade in a selected position since the mechanism utilized was not readily adjustable without a great deal of effort.

Thus, there still exists a need in the art for a slicer for vegetables or the like which provides a simple to operate yet positive working blade adjustment mechanism. Accordingly, it is a primary object of the subject invention to provide such a slicer. Other and equally important objects of the subject invention are as follows:

(a) To provide a slicer offering portable operation yet effective to slice a wide variety of vegetables, fruits and the like to any desired thickness;

(b) To provide a slicer of extremely simple construction facilitating the manufacturing thereof as well as its use;

(c) To provide a slicer employing a novel lever action to adjust and maintain the cutting knife blade in any selected position;

(d) To provide a slicer requiring very little maintenance throughout its operative life;

(e) To provide a slicer operative to slice vegetables or the like to uniform thicknesses.

The above and other objects of the subject invention are implemented by the novel slicer construction disclosed herein, such construction contemplating the provision of a body portion which provides a platform and side supports, the side supports of the body portion extending forwardly beyond the front edge of the platform and defining internal, vertically extending tracks open at their upper ends. Blade or knife means are provided extending between the forwardly projecting portions of the side supports and in spaced relation to the front edge of the platform thus defining a space wherein the vegetable slices can drop onto a plate or the like. Blade support means for the knife blade are coupled to each end of the knife blade and are slidably secured in the vertically extending tracks to thus make the knife blade adjustable as to its height above the platform.

A novel arrangement for actually adjusting the height of the knife blade is provided, such arrangement comprising a lever member which is substantially U-shaped in construction and formed of a resilient, deformable material such as strip steel or the like. The substantially U-shaped lever member has two extending leg portions placed in superposed relation to the side supports of the slicer body and a base portion extending between the side supports in spaced relation to the rear edge of the platform. The ends of the leg portions of the lever member are coupled to the blade support means, each leg portion being pivotally secured to the side supports by a fastening means to thus form lever arms whereby movement of the lever means about its pivotal mounting points serves to adjust the vertical height of the knife blade. The lever member and thus the knife blade is maintained in each selected position thereof by a suitable engagement means preferably comprising, in a preferred embodiment of the invention, a plurality of indentations on at least one of the side supports of the body portion and detent means included on at least one of the leg portions of the lever member, the detent means being frictionally engaged in selected ones of the indentations on the side supports.

When adjustment of the blade height is desired, however, the user of the novel slicer mechanism would depress the base portion of the lever member thus elastically deforming the leg portions thereof is superposed relation to the side supports. Such elastic deformation releases the engagement means and thus allows adjustment of the lever and thus the blade height. When a new blade height has been achieved, the base portion of the lever member is released and the lever member is then engaged in a new position maintaining the blade at the selected height.

The invention will be better understood and other objects, advantages, and features thereof will become readily apparent when reference is given to the following detailed description of a preferred embodiment thereof, such description making reference to the appended drawing wherein:

FIG. 1 is a perspective view of the novel slicer constructed in accordance with the subject invention; and, FIG. 2 is an elevational view of the novel slicer of the subject invention, with parts being broken away for illustrative purposes.

Referring now to the drawing and to both FIGS. 1 and 2 thereof, the novel slicer of the subject invention is seen to comprise a body portion generally designated 1, preferably formed of sheet metal and providing a raised platform 2 having side supports 4. The side supports or walls 4 carry front and rear portions 8 and 6, respectively, defining leg members. As is depicted, the rear leg member 6 is preferably constructed longer than the front leg member or portion 8 such that the platform 2 of the novel slicer is disposed at an inclination, such inclination facilitating operation of the device in the manner to be discussed below.

The front portions 8 of the side walls 4 are seen to forwardly project beyond the front edge of the platform 2. These forwardly projecting portions 8 are bent out at a suitable angular position to define vertically extending tracks generally designated 12, such tracks being open at their upper end. Marginal portions of the legs and the portion of the side walls between these legs are bent inwardly to provide flanges 10 which serve to reinforce the slicer and also serve to provide flat lower leg surfaces allowing the slicer to be placed upon a table, for example, without fear of damaging the same. Such flanges 10 also eliminate sharp edges along the margins of the side walls and legs of the body enabling the user of the novel slicer mechanism to handle the same without fear of cutting her fingers. If desired, the general shape of the platform 2 of the novel slicer can be constructed as a trapezoid with the rear portion or right-hand portion thereof as depicted in FIG. 2 being of a greater lateral width than is the front portion. Such trapezoidal construction effects greater stability of the novel slicer during operation.

The vertically extending tracks generally designated 12 formed by the forwardly projecting portions 8 of the side walls 4 are adapted to receive blade support means 20 which are slidably secured in the vertically extending track 12 by a screw or rivet 26 adapted to ride in a slot 22 extending through the forwardly projecting portions 8. A cutting blade or knife 14 is secured to the blade support means at either end thereof through a suitable fastening means such as rivets 24 or the like. The blade 14 has a cutting surface or edge 16 and is supported in spaced relation to the front edge of the platform 2 extending between the forwardly projecting portions 8 of the side walls 4. The positioning of the blade 14 is such as to define a narrow space 18 through which vegetable slices or the like can drop onto an underlying plate or the like.

A novel lever mechanism generally designated 28 provided to adjust the height of the blade means or cutting knife 14 by effecting a vertical displacement of the blade support means 20 in the fashion to be described. The lever member or means 28 is seen to comprise a substantially U-shaped element preferably constructed of a resilent, deformable material which provides extending leg portions 30 in superposed relation to the side walls 4 and a connecting base portion 38 extending between the side walls 4 and in spaced relation to the rear or right-hand edge of the platform 2. The leg portions 30 of the lever member 28 are seen to be pivotally secured to the side walls 4 through the use of further suitable fastening means 26 such as rivets or the like. Such mounting of the lever means or member 28 defines, as is shown, two lever arms to either side of the pivotal mounting point. The ends of the leg portions 30 of the lever means 28 pivotally secured or coupled to the blade support means 20 through the fastening means 26 extending through the arcuate slot 22 in the forwardly projecting portions 8 of the side walls 4. As should be apparent, motion of the lever 28 in an upward or downward direction about its pivotal mounting point 38 would serve to raise or lower the blade support means 20 and thus the knife blade 14 attached thereto to any desired position above the surface of the platform 2.

In the preferred embodiment of the invention, a plurality of indentations generally designated 34 are provided on at least one of the side walls 4. A detent mechanism or the like 36 is constructed on one of the leg portions 30 of the lever member generally designated 28, such detent means 36 fitting into the indentations 34 in the side walls 4 and thus securing the lever member 28 in any selected position.

However, when it is desired to move the lever member 28 and thus to re-adjust the height of the blade 14 above the platform surface 2, the base portion 32 of the lever member 28 can be depressed with the thumb or index finger of the user to thus deform both the base portion and the leg portions of the lever member 28 into the position shown in dotted lines in FIG. 1. As is apparent, such elastic deformation temporarily releases the detent 36 on the leg portion 30 from the indentation 34 in the side wall 4, the detent and indentations, of course, defining engagement means, such that the lever member 28 can be raised or lowered and thus the height of the knife blade 14 can be raised or lowered as desired. When a new position has been selected, the base portion 32 of the lever means 28 would be released and the detent 36 on the leg portion 30 would again frictionally engage one of the indentations 34 in the side wall 4.

If desired, the engagement means comprising the detent 36 and the indentations 34 can be eliminated thus affording an even simpler construction of the novel slicing arrangement. If such engagement means were to be eliminated, however, then suitable tightening of the pivotal fastening means 38 would be effected such that the frictional contact of the leg portions 30 of the lever member 28 with the side walls 4 of the body portion of the novel slicing arrangement would be sufficient to maintain the lever member 28 in any selected position. Naturally, when adjustment of the blade height was desired and thus movement of the lever member 28 necessary, the base portion 32 thereof still would be depressed to elastically deform the lever member 28 thus facilitating upward or downward motion thereof.

In operation, the height of the cutting knife or blade means 14 above the platform surface 2 would first be adjusted to some desired level through operation of the novel lever member or means 28. A vegetable or other item to be sliced would then be held in one hand against the surface of the platform 2 while the user's other hand would hold the base portion 32 of the lever member 28 to secure the slicer itself in one location upon the table. The vegetable would then be brushed lightly against and over the cutting blade 14 by moving the vegetable down the inclined surface of the platform 2. Such motion would serve to slice a portion of the vegetable to a thickness determined by the height of the cutting blade 14 above the platform surface 2. Each slice of the vegetable would drop through the space 18 between the knife or cutting means 14 and the front edge of the platform 2 onto the table or a non-illustrated plate, for example.

If the user of the novel slicer apparatus desires to change the thickness of the slices effected, the base portion 32 of the lever member or means 28 would be depressed with the thumb or index finger of the user such that the lever member 28 is elastically deformed into the position shown in dotted lines in FIG. 1. The base portion 32 would then be raised up or down effecting up and down motion of the blade support members or means 20 in the vertically extending tracks 12 and thus effecting adjustment of the height of the cutting blade 14 above the platform surface 2. When suitable adjustment has been effected, the base portion 32 of the lever member or means 28 would be released and would elastically return to its full line position, as shown in FIG. 1, whereby the detent 36 on the leg portion 30 of the lever member would frictionally engage in one of the indentations 34 on the side supports 4, thus maintaining the lever member 28 in its selected position and thus maintaining the adjusted height of the blade or cutting means 14. Now, the user of the novel apparatus would again brush the vegetable into and over the knife blade 14 thus slicing off additional slices of the newly selected thickness.

As is apparent, the objects initially set forth at the outset of this specification have been successfully achieved.

What is claimed is:

1. A slicer comprising a body providing a platform and side supports, said side supports extending forwardly beyond the front edge of said platform, the forwardly projecting portions of said side supports forming internal, vertically extending tracks open at their upper ends; blade means extending between said forwardly projecting portions of said side supports in spaced relation to the front edge of said platform; blade support means coupled to each end of said blade means and slidably secured in said vertically extending tracks; substantially U-shaped lever means having leg portions and a base portion, said leg portions being in superposed relation to said side supports, said base portion extending between said side supports in spaced relation to the rear edge of said platform; means for pivotally securing said leg portions of said lever means to said side supports to form lever arms, and means for coupling the ends of said leg portions to said blade support means, whereby movement of said lever means adjusts the vertical height of said blade means.

2. A slicer as defined in claim 1, wherein said substantially U-shaped lever means is constructed of resilient material; engagement means for maintaining said lever means in selected positions about the pivot locations defined by said means for pivotally securing said leg portions of said lever means to said side supports and thus for maintaining said blade means at selected vertical heights; said lever means being elastically deformable through the application of pressure to said base portion thereof, whereby said engagement means are released.

3. A slicer as defined in claim 2, wherein said engagement means comprises indentations on at least one of said side supports, and detent means on at least one of said leg portions of said lever means cooperating with said indentation.

4. A slicer as defined in claim 2 further comprising arcuate slots formed in said forwardly projecting portions of said side supports; and fastening means extending through said arcuate slots for slidably securing said blade support means in said vertically extending tracks and for pivotally coupling the ends of said leg portions of said lever means to said blade support means.

References Cited

UNITED STATES PATENTS

| | | | |
|---|---|---|---|
| 2,501,076 | 3/1950 | Morris | 146—171 |
| 2,508,320 | 5/1950 | Wheelwright | 146—171 |

FOREIGN PATENTS

| | | |
|---|---|---|
| 838,943 | 5/1952 | Germany. |

W. GRAYDON ABERCROMBIE, Primary Examiner